US012086551B2

(12) United States Patent
Abraham et al.

(10) Patent No.: US 12,086,551 B2
(45) Date of Patent: Sep. 10, 2024

(54) SEMANTIC DIFFERENCE CHARACTERIZATION FOR DOCUMENTS

(71) Applicant: Microsoft Technology Licensing, LLC, Redmond, WA (US)

(72) Inventors: Robin Abraham, Redmond, WA (US); J Brandon Smock, Seattle, WA (US); Owen Stephenson Whiting, Seattle, WA (US); Henry Hun-Li Reid Pan, Sammamish, WA (US)

(73) Assignee: Microsoft Technology Licensing, LLC, Redmond, WA (US)

( * ) Notice: Subject to any disclaimer, the term of this patent is extended or adjusted under 35 U.S.C. 154(b) by 286 days.

(21) Appl. No.: 17/356,037

(22) Filed: Jun. 23, 2021

(65) Prior Publication Data

US 2022/0414336 A1    Dec. 29, 2022

(51) Int. Cl.
*G06F 40/30* (2020.01)
*G06F 18/2431* (2023.01)
*G06F 40/205* (2020.01)
*G06N 20/00* (2019.01)
*G06V 30/418* (2022.01)

(52) U.S. Cl.
CPC .......... *G06F 40/30* (2020.01); *G06F 18/2431* (2023.01); *G06F 40/205* (2020.01); *G06N 20/00* (2019.01); *G06V 30/418* (2022.01)

(58) Field of Classification Search
CPC .... G06F 40/30; G06F 18/2431; G06F 40/205; G06N 20/00; G06V 30/418
See application file for complete search history.

(56) References Cited

U.S. PATENT DOCUMENTS

| | | | |
|---|---|---|---|
| 6,502,112 B1* | 12/2002 | Baisley | G06F 40/194 707/999.203 |
| 2002/0188602 A1* | 12/2002 | Stubler | G06F 16/5838 |
| 2010/0198827 A1* | 8/2010 | Yacoub | G06F 16/951 707/739 |
| 2014/0245123 A1* | 8/2014 | Pircher | G06F 40/169 715/232 |
| 2017/0243082 A1* | 8/2017 | Song | G06N 3/045 |
| 2019/0073529 A1* | 3/2019 | Mandelbaum | G06Q 30/0225 |
| 2019/0286741 A1* | 9/2019 | Agarwal | G06F 40/197 |

(Continued)

OTHER PUBLICATIONS

Stackoverflow.com, "How to get diff to report summary of new, changed and deleted lines," Mar. 8, 2017 (available at: https://stackoverflow.com/questions/767198/how-to-get-diff-to-report-summary-of-new-changed-and-deleted-lines, last accessed May 30, 2023) (Year: 2017).*

*Primary Examiner* — Bhavesh M Mehta
*Assistant Examiner* — Darioush Agahi
(74) *Attorney, Agent, or Firm* — Schwegman Lundberg & Woessner, P.A.

(57) ABSTRACT

A computer implemented method determines differences between documents. The method includes parsing a first document and a second document into respective distinct instances of content. The distinct instances of content are classified into different categories. Category specific matching algorithms are applied to each of the respective instances of content to determine a similarity score for each of the respective instances of content. Semantic differences between the first document and the second document are analyzed as a function of the similarity scores. A characterization of the semantic differences is generated.

20 Claims, 7 Drawing Sheets

(56) References Cited

U.S. PATENT DOCUMENTS

| | | | |
|---|---|---|---|
| 2021/0064908 A1* | 3/2021 | Semenov | G06V 30/413 |
| 2022/0030110 A1* | 1/2022 | Khafizov | H04M 3/2218 |
| 2022/0108556 A1* | 4/2022 | Peng | G06F 40/103 |
| 2022/0254143 A1* | 8/2022 | Lin | G06F 16/3347 |

\* cited by examiner

SEMANTIC DIFFERENCE CHARACTERIZATION FOR DOCUMENTS

BACKGROUND

Prior procedures for computing a difference between two text files compare two sequences of symbols (for example, words or program code) in the respective instances and align the two sequences in order of the matching content between them. Determining how two files or documents differ, may be referred to in the art as diffing, or determining a diff. Symbols in the first sequence that are not matched within the second sequence are considered "removed", while symbols in the second sequence not matched within the first sequence are considered "added". The diff procedure serves as both a way to identify differences and determine a set of edits that transform from one version of a sequence of symbols to another.

There are significant limitations of the standard symbolic approach to computing a diff when applied to documents and other types of content. Some documents contain content, such as images, that is not purely symbolic. Documents may also contain content that is not in order, such as a footnote of text and the document's main body of text. Simple symbol matching assumes a binary match/no-match that ignores the degree of difference between two instances of a document.

SUMMARY

A computer implemented method determines differences between documents. The method includes parsing a first document and a second document into respective distinct instances of content. The distinct instances of content are classified into different categories. Category specific matching algorithms are applied to each of the respective instances of content to determine a similarity score for each of the respective instances of content. Semantic differences between the first document and the second document are analyzed as a function of the similarity scores. A characterization of the semantic differences is generated.

The ability to identify the semantic differences provides a much more robust characterization of the differences between document than prior diffing methods beyond simply identifying symbolic differences. Furthermore, a human is able to both quantitatively note the amount or degree of difference between instances and qualitatively characterize the manner of difference in a descriptive way.

DETAILED DESCRIPTION

In the following description, reference is made to the accompanying drawings that form a part hereof, and in which is shown by way of illustration specific embodiments which may be practiced. These embodiments are described in sufficient detail to enable those skilled in the art to practice the invention, and it is to be understood that other embodiments may be utilized and that structural, logical and electrical changes may be made without departing from the scope of the present invention. The following description of example embodiments is, therefore, not to be taken in a limited sense, and the scope of the present invention is defined by the appended claims.

The functions or algorithms described herein may be implemented in software in one embodiment. The software may consist of computer executable instructions stored on computer readable media or computer readable storage device such as one or more non-transitory memories or other type of hardware-based storage devices, either local or networked. Further, such functions correspond to modules, which may be software, hardware, firmware or any combination thereof. Multiple functions may be performed in one or more modules as desired, and the embodiments described are merely examples. The software may be executed on a digital signal processor, ASIC, microprocessor, or other type of processor operating on a computer system, such as a personal computer, server or other computer system, turning such computer system into a specifically programmed machine.

The functionality can be configured to perform an operation using, for instance, software, hardware, firmware, or the like. For example, the phrase "configured to" can refer to a logic circuit structure of a hardware element that is to implement the associated functionality. The phrase "configured to" can also refer to a logic circuit structure of a hardware element that is to implement the coding design of associated functionality of firmware or software. The term "module" refers to a structural element that can be implemented using any suitable hardware (e.g., a processor, among others), software (e.g., an application, among others), firmware, or any combination of hardware, software, and firmware. The term, "logic" encompasses any functionality for performing a task. For instance, each operation illustrated in the flowcharts corresponds to logic for performing that operation. An operation can be performed using, software, hardware, firmware, or the like. The terms, "component," "system," and the like may refer to computer-related entities, hardware, and software in execution, firmware, or combination thereof. A component may be a process running on a processor, an object, an executable, a program, a function, a subroutine, a computer, or a combination of software and hardware. The term, "processor," may refer to a hardware component, such as a processing unit of a computer system.

Furthermore, the claimed subject matter may be implemented as a method, apparatus, or article of manufacture using standard programming and engineering techniques to produce software, firmware, hardware, or any combination thereof to control a computing device to implement the disclosed subject matter. The term, "article of manufacture," as used herein is intended to encompass a computer program accessible from any computer-readable storage device or media. Computer-readable storage media can include, but are not limited to, magnetic storage devices, e.g., hard disk, floppy disk, magnetic strips, optical disk, compact disk (CD), digital versatile disk (DVD), smart cards, flash memory devices, among others. In contrast, computer-readable media, i.e., not storage media, may additionally include communication media such as transmission media for wireless signals and the like.

Documents may be revised, resulting in different versions of the document. The revisions may include changes to symbols, such as words, sentences, numbers, or lines of code between versions of the document. Such changes are referred to as symbolic changes. The term "documents" is used herein to include many different types of content, such as images, brochures, text files, video, and other forms of conveying information.

Other changes within a document may be non-symbolic in nature, such as changes to image-like content. From a human's perspective, changes may be interpreted semantically rather than symbolically. These semantic changes apply to instances at a higher level of abstraction than symbols and pixels, such as captions or figures. The term "semantic difference" or "semantic diff" refers to all the ways one can recognize and understand instances of content and characterize differences between them beyond simply identifying symbolic differences. Furthermore, a human is able to both quantitatively note the amount or degree of difference between instances and qualitatively characterize the manner of difference in a descriptive way.

Prior procedures for computing a diff between document versions includes comparing two sequences of symbols (for example, words or program code) from two documents and aligns them in order matching the content between them. Symbols in the first sequence that are not matched within the second sequence are considered "removed", while symbols in the second sequence not matched within the first sequence are considered "added".

Tracking and reviewing semantic changes to documents is helpful for collaborative content creation and reviews. In some cases, changes to a document are recorded and tracked over time as the document is edited. In many cases, however, these changes are not tracked or are not tracked in a way that is semantically meaningful.

Documents may contain content that is not purely symbolic, such as images and video as well as content that is not in order, such as a footnote of text and the document's main body of text. Symbol matching fails to identify format changes and changes to images and videos. Simple symbol matching also assumes a binary match/no-match that ignores the degree of difference between two documents.

An improved diffing system utilizes different matching algorithms for different categories of content to identify semantic differences between two documents. Symbolic differences may also be identified. The system provides a difference characterization to identify the differences between two documents such as versions of a document. The difference characterization also provides an indication of the degree of change for the identified differences.

In one example, the system uses AI models to compute intelligent semantic differences. The system may be useful in content creation software and for systems that support content creation, refinement, and approval workflows.

The system computes differences at a semantic level by recognizing semantically meaningful instances of content within a document and then comparing the differences in such instances of content at a semantic level.

A unified intelligent semantic diff procedure utilized by the system recognizes different categories of content, such as images and tables, and generates a distinct and more meaningful difference characterization for each category. One example includes providing a characterization that identifies that a table has a new row or column, rather than simply recognizing that additional symbols were added to a document.

The system identifies individual instances of semantic content that are modified between versions of a document. Instead of simply identifying that symbols have been added or removed, the system applies methods to compute scores that describe the degree or character of the difference. Examples may include noting how similar a word is to the word it was substituted for or determining if a substitution contains a more positive sentiment; or determining if an image within an artifact changes and becomes more memorable, etc.

Memorability may be determined using images labeled memorable or not memorable to train a model. Each subsequent image instance of content input to the model will be classified as memorable or not memorable with a confidence level.

The system may also include a recursive symbolic diff procedure that recognizes symbolic content that is re-ordered, in addition to simply being added and removed. A characterization of the re-ordering may be provided as a further semantic difference.

Figure 1:
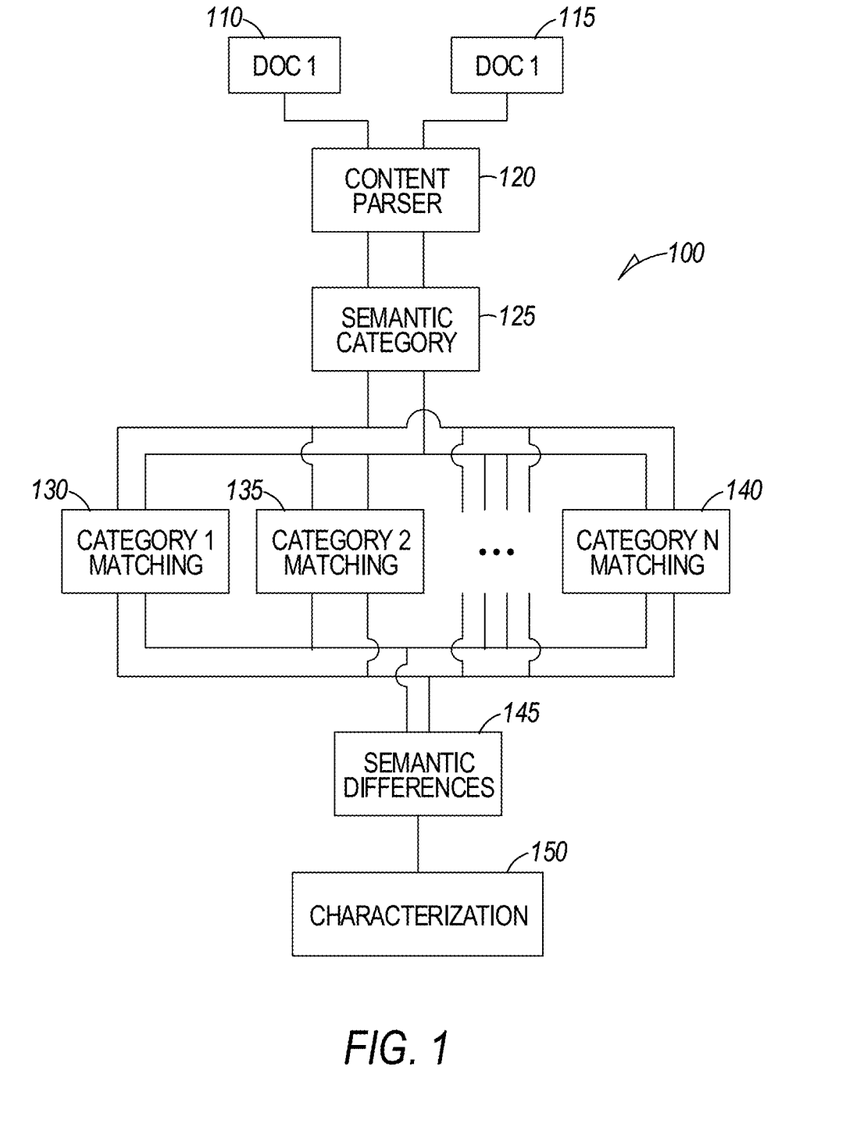
FIG. 1 is a block diagram of an improved difference generator system that is configured to determine differences between two documents according to an example embodiment.

FIG. 1 is a block diagram of an improved diffing system 100 that is configured to determine differences between two documents 110 and 115. Documents 110 and 115 may be text-based documents, such as documents that can be edited by various types of programs, such as word processors, spreadsheet programs, image and graphics editing programs, and many other types of programs that can provide a perceivable output. The documents in one example comprise different versions of one document.

Documents 110 and 115 may contain many different types of content, such as different types of text, images, tables, and other types of content. Text may include different types of text, such as title, authors, references, captions, footnotes, etc.

A content parser 120 receives the documents 110 and 115 and parses each document into distinct instances of types of content, such text, images, and tables, as well as different types of text. The content parser 120 may utilize a machine learning model that has been trained on documents having such types of content identified by labeled bounding boxes. Parsing creates bounding boxes around different instances of content. A bounding box simply identifies a perimeter around an instance of content.

One or more models may be used to identify the instances of content and may also be used to identify a semantic category 125 to identify the different types or semantic categories of content, such as a table model, an image model, and a text model, or via one or more models trained on various combinations of the types of models. Specific types or semantic categories of text may include section headings, sections, headers, footers, titles, authors, references, captions, etc. The output of the content parser 120 provides instances of content for each document within bounding boxes.

The instances of content within the bounding boxes are classified into semantic categories 125 by the content parser 120. The semantic categories of the instances of content are used to select one of multiple category matching algorithms, as indicated at category 1 matching algorithm 130, category 2 matching algorithm 135 and category N matching algorithm 140.

The context of an instance can also be taken into account during content matching to identify a difference that is a modification to the same instance of content, rather than the addition or removal of different content instances. The context of an instance includes immediately neighboring content instances, as well as any other content instance in which one of the two instances is considered to be a smaller part of the other content instance, such as a table and a column or row within the table. In one example, two instances of content from the respective documents may be matched if they have similar content and are in a similar location, such as in a same identified section or paragraph, with similar surrounding content. An image or table or text may have a title or section heading adjacent to or near the instance of content which can be identified as local to and associated with the instance of content. Each of those may also be instances of content. By comparing the locations of these local instances of content in both documents, the likelihood of matching the two instances can increase or decrease.

The degree of similarity or difference between content instances can be determined using embeddings or vector representations produced by machine learning or deep learning models. These embeddings may come from, for instance, the output of the second-to-last layer of the content parser model that identifies the content instances themselves. The embeddings can numerically represent properties both of the instances and of their surrounding context. The similarity of two embeddings can be quantified using Euclidean distance or cosine similarity. An adjustable threshold can be used to determine that two instances with similar embeddings are similar enough to be considered the same.

For each semantic category, one of the category-specific matching algorithms 130, 135, 140 is used to match instances that are identical, or similar if there is no identical match.

Once category matching has occurred and a diff has been computed at the semantic level, for each occurrence of a modification from one instance to another, the matching algorithms generate a characterization 150 of the difference between the two instances. The difference is analyzed in any way that two instances of content can be characterized. For instance, if one image is modified to become another image, the properties of each image may be computed with the characterization 150 indicating how the properties changed from one version of the instance to another.

Figure 2:
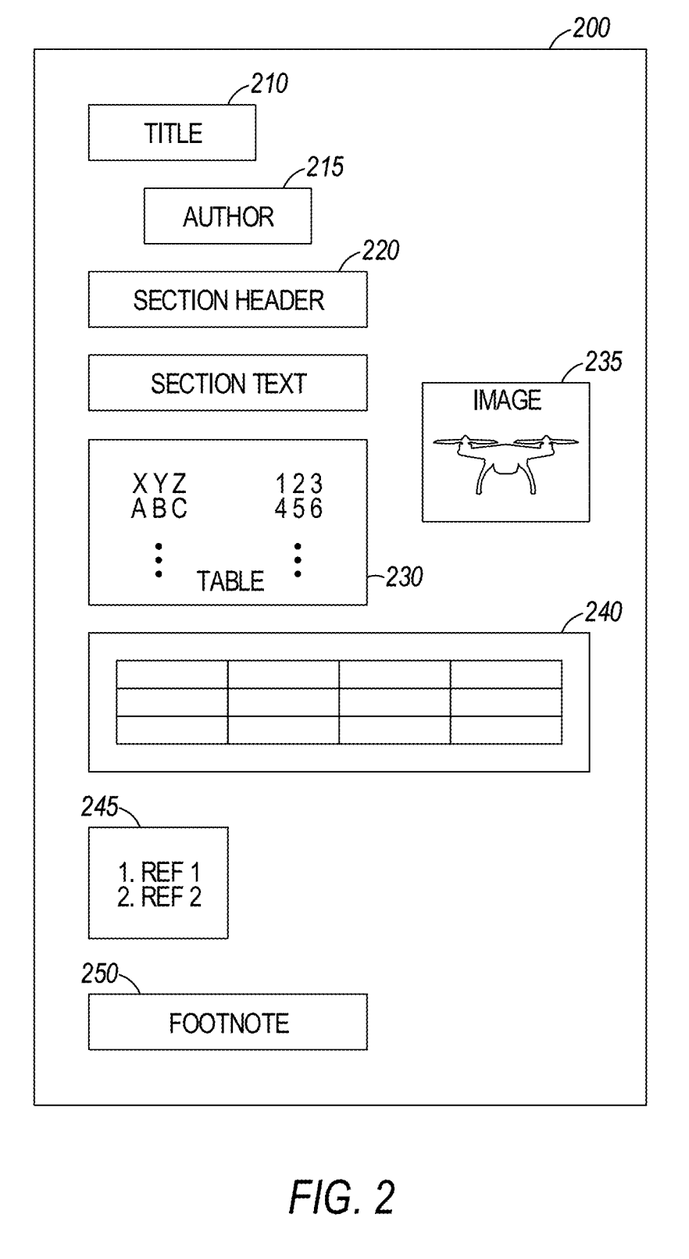
FIG. 2 is a block diagram representation of a single page of a document illustrating instances of content that have been identified according to an example embodiment.

FIG. 2 is a block diagram representation of a single page 200 of a document illustrating instances of content that have been identified according to an example embodiment. Bounding boxes establishing a perimeter around each instance of content have been added to the document. Several different types of instances of content have been identified, including a title 210, author 215, section header 220, section text 225, table 230, image 235, spreadsheet 240, reference list 245, and footnote 250. There may be many more different types of content in further examples.

Each of the instances of content is shown at a particular location on the page 200. The location can be identified via the use of an x,y cartesian coordinate system having an origin at one corner of the page 200. The page may be treated as a bit map, or by using a less granular page normalized range of 1 to n, where n may be 100 or other selected number that provides sufficient granularity. An instance of content may be located by providing an x,y coordinate of the center of the instance of content, with a height and width, or by specifying the minimum (x, y) and maximum (x, y) coordinates of the bounding box. Other methods that provide suitable location information from which location and context can be derived may be used in further examples.

In one example, category 1 matching algorithm 130 is used to perform matching for text. The matching may be done using symbolic matching methods to find the longest common sequence of symbols. The longest common subsequence is constrained to appear in the same order in both documents.

Recognizing reordered instances of text may also be performed in a recursive manner. In one example, a first pass is used to match sequences of text. In a second pass, matching additional sequences of text may be performed by determining differences between previously unmatched text, where a minimum sequence length is used to ensure new content matches are meaningful.

A semantic natural language model may also be used on text to compare sentence embeddings to determine whether the meaning of the text has been changed between documents. For example, a BERT-based sentence embedding model could be used to embed two versions of a sentence in two documents, and Euclidean distance or cosine similarity could be used to determine the degree to which the meaning of a sentence has changed from one version to the next.

Category 2 matching algorithm 130 may be used for images. Images may be compared by using known convolution algorithms or machine learning models to produce similarity scores. In further embodiments, image recognition models may be used to identify elements within images for comparing. For instance, an image in one document may include a cat, while the image in the other document may include a dog in place of the cat. If the background of the images is the same, the similarity score, in combination with the classification of the cat and dog in the image, may be indicative of the semantic difference between the images being mostly likely just a replacement of a cat with a dog.

Any type of content instance in a document that appears in a defined sequential order can be determined to be reordered from one document to another by computing the longest subsequence of matching content instances between the two documents and considering any matches that are not in the longest subsequence to be reordered. This applies to content types such as images, tables, lists, and others.

Category matching algorithm 140 may be used to match tables in the two documents. In one example, document 110 may have 3 tables, and document 115 may have 4 tables. The differences may be recognized by analyzing the number of rows and columns in each table, and whether text in the rows and columns symbolically matches. This analysis allows the identification of new rows or columns being added or removed between the documents. The order of tables and whether tables match may also be identified to generate similarity scores from which the differences may be characterized.

The matching algorithms compute a similarity score between different instances of content in the two versions of the document and compute a bi-partite matching between the two sets of instances such that the total similarity score between the sets of instances is maximized. Alternatively, a greedy matching scheme could iteratively select the most similar pair of unmatched instances until there are no more instances to match or a stopping criterion is reached. The similarity between two instances of content thus includes both the similarity of their content and their context.

If an instance of content in one version of a document has a match, then the instance falls into one of three categories: Same, modified, or re-ordered.

In the same category, both the content and context match for the instances of content. In the modified category, the context matches but the content is different. In the re-ordered category, the content matches but the context is different.

If an instance in the first version of the document has no match in the second document, it is considered removed. If an instance in the second version of the document has no match, it is considered added.

Figure 3:
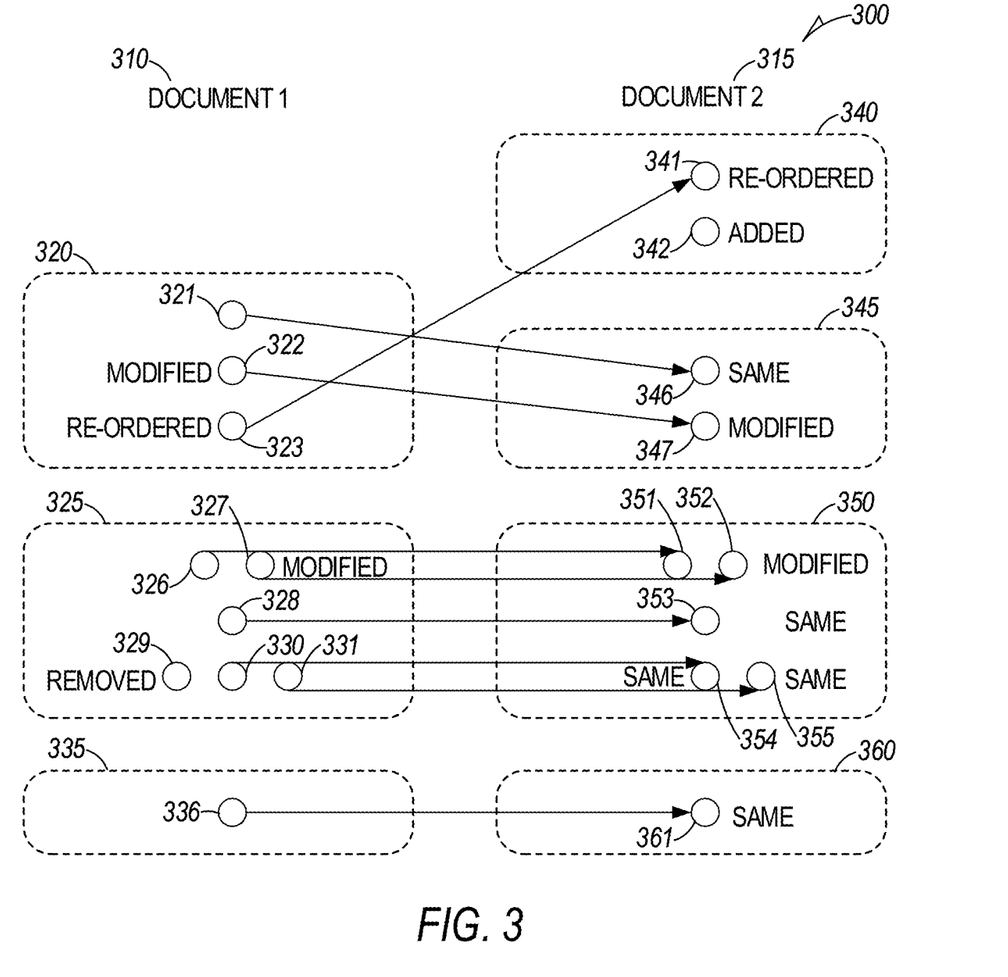
FIG. 3 is a visualization of matching to determine changes between two documents according to an example embodiment.

FIG. 3 is a visualization 300 of matching to determine changes between two documents by the semantic difference analyzer 145. The two documents are represented as pages in a first column 310 and a second column 315. Pages of the first document are indicated at first page 320, second page 325, and third page 335. Pages of the second document are indicated at first page 340, second page 345, third page 350, and fourth page 360.

The first document represented in column 310 on first page 320 includes three identified instances of content, 321, 322, and 323. Second page 325 includes five identified instances of content, 326, 327, 328, 329, 330, and 331. The third page 335 includes one instance of content 336. Circles are used to represent the instances of content. Instances of content may be referred to as content for ease of reference.

The second document represented in column 315 on first page 340 includes two instances of content, 341 and 342. Second page 345 includes two instances of content 346 and 347. Third page 350 includes five instances of content, 351, 352, 353, 354, and 355. The fourth page 360 includes one instance of content, 361.

A number of similarities and semantic differences 145 have been identified by category matching 130, 135, 140, and are represented by lines pointing to where instances of content in the first document appear in the second document. Categories of the change, such as added, modified, removed, same, and re-ordered are also included. In addition, color coding may be used to highlight the categories of change.

In this example, content 321 has been moved from the first page 320 of the first document to the second page 345 of the second document at 345 but is the same. Content 322 on the first page 320 of the first document has also been moved to the second page 345 of the second document at 347. Both content 322 and content 347 are labeled as modified. Note that content 321 and 322, as well as content 346 and 347 are in the same order relative to each other but occur on different pages of the two documents.

The category matching algorithms generate matching information that includes location information for each instance of content as well as identifying similarity scores. The matching information is used by the category matching algorithms to determine whether content has been re-ordered, is the same, has been modified, or has been added.

Content 323 from the first document has moved to the second document at 341 but is now in a different order relative to the other content. Content 341 is now ahead of content 346 and 347, whereas in the first document, content 323 followed content 321 and 322. As such, both content 323 and 341 are labeled as re-ordered.

There was no match for content 342, which is labeled as added to the second document. Similarly, there was no match for content 329, which is labeled as removed from the first document. The labels appearing in a document represent the change relative to the other document for the instance of content occurring in the document in which the label appears.

In one example, the color of each circle representing the instance of content may be the same in each document where the content did not change. A different color may be used for same content that was moved. Added content may be a further color, such as green, while removed content may be represented as red.

Figure 4:
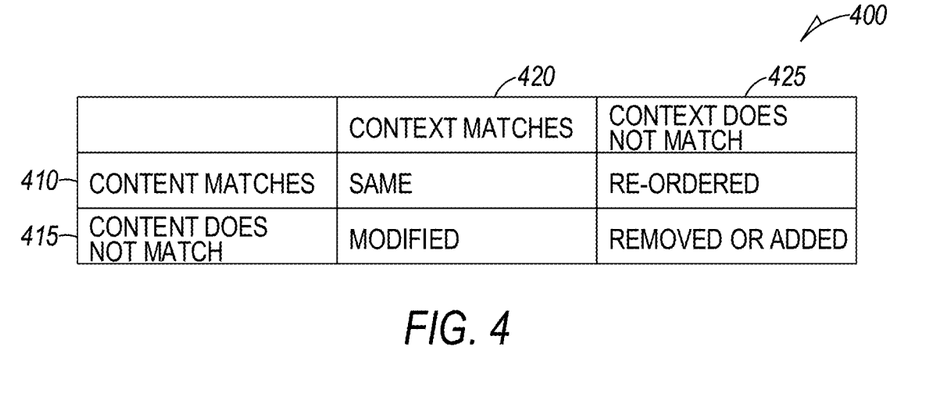
FIG. 4 is a table showing the assignment of categories based on content and context matching according to an example embodiment.

FIG. 4 is a table 400 showing the assignment of categories based on content and context matching. A first row 410 represents content matches and a second row 415 represents where the content does not match. A first column 420 represents context matches and a second column 425 represents where context does not match. Matching content and context results in a category of "same." A content match and context not matching results in a category of "re-ordered." A content that does not match and a context that matches, results in a category of "modified." A content that does not match and a context that does not match results in a category of "removed" or "added."

Figure 5:
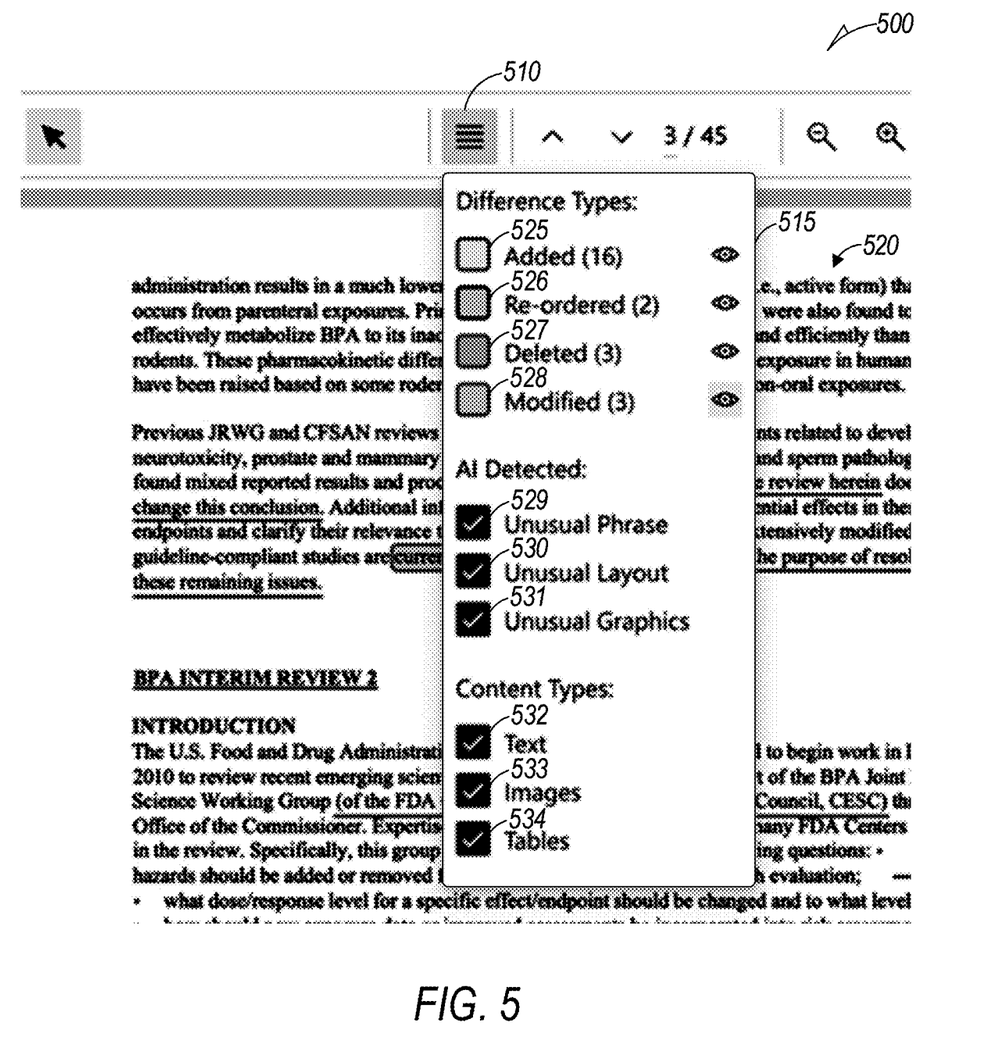
FIG. 5 is a representation of a user interface for use in viewing differences between documents according to an example embodiment.

FIG. 5 is a representation of a user interface 500 for use in viewing differences between documents according to an example embodiment. Interface 500 includes an icon 510 for selection to cause a display of a summary of differences 515 showing difference types with statistics. The summary of differences is displayed for the document 520 that a user has open and for which the icon 510 is associated. The actual text in in the underlying document 520 is not relevant herein.

In one example, the summary of differences 515 shows several icons that may be color coded to correspond to colors of instances of content in the document. An added icon 525 is shown with summary information that 16 changes have been found. A re-ordered icon 526 is shown with summary information that 2 re-orderings have been found. A deleted icon 527 is shown with summary information that 3 deletions have been found. A modified icon 528 is shown with summary information that 3 modifications have been found.

The summary of differences may also include unusual content detected by one or more machine learning models and include icons that are checked unusual content was found. The unusual content icons may include an unusual phrase icon 529, unusual layout icon 530, and unusual graphic icon 530. These icons may also be color coded with corresponding colors highlighting corresponding instances of content in the document.

Content types may also be indicated as detected via check marked icons 532, 533, and 534 for text, images, and tables respectively. Further content type icons may be used for the different types of text detected.

Figure 6:
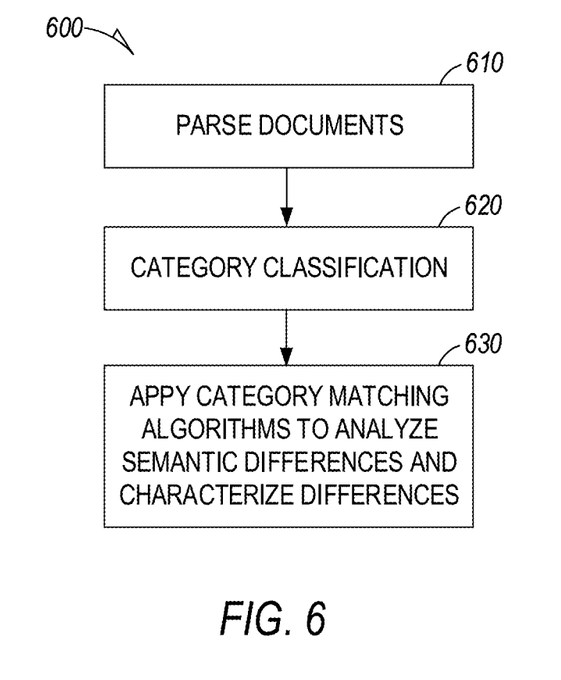
FIG. 6 is a flowchart of a computer implemented method of identifying and characterizing changes between two documents according to an example embodiment.

FIG. 6 is a flowchart of a computer implemented method 600 of identifying and characterizing changes between two documents according to an example embodiment. Method 600 begins at operation 610 by parsing a first document and a second document into respective distinct instances of content.

At operation 620, the distinct instances of content are classified into different categories. Classifying the distinct instances of content into different categories may include classifying the instances of content into one of a text, an image, or a table category. Text may be further classified into section headings, sections, headers, footers, titles, authors, references, and captions.

The category specific matching algorithms may include machine learning models trained on labeled respective category training data.

Category specific matching algorithms are applied to each of the respective instances of content at operation 630 to determine a similarity score for respective instances of content. The similarity score for respective instances of content may be determined as a function of similarity of content of the respective instances of content and similarity of context of the respective instances of content. One way to compute context similarity for two instances is to compute the percentage of identically matching instances immediately surrounding the two instances in 1D or 2D. In one example, a similarity score between instances is exact matching, which produces a score of either 0 or 1. Another example uses the distance between embeddings produced by a machine learning model that operates on the instances.

Operation 630 further analyzes semantic differences between the first document and the second document as a function of the similarity score. The semantic differences may be categorized as the same, added, removed, and re-ordered.

In one example, the similarity of context of the respective instances of content is a function of each respective instance of content's position with respect to other local identified instances of content. Image embeddings may be compared to determine contexts for respective instances of content comprising images.

A characterization of the degree and manner of differences is generated at operation 650. Generating the characterization of the semantic differences is performed for each of the instances of content that are modified from one document to another.

In one example, the characterization is performed by computing a specific property of two modified instances and comparing these properties before and after modification. For instance, after modification a phrase may have more positive sentiment, which characterizes in one way the difference between the phrase in each document.

Figure 7:
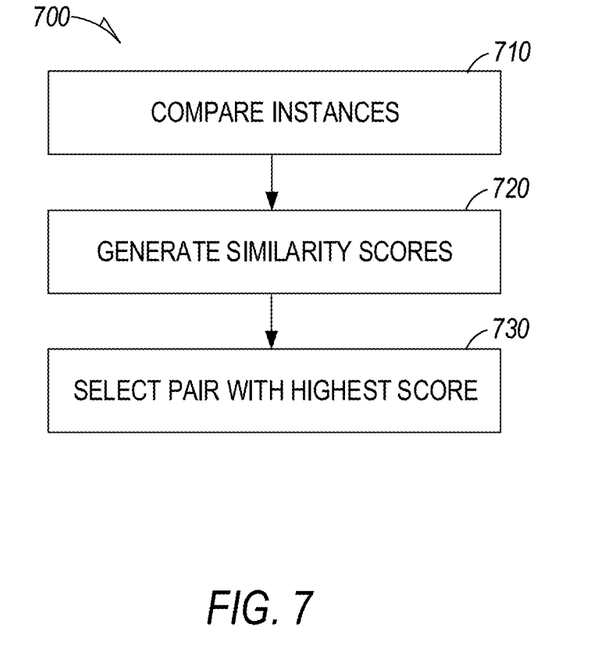
FIG. 7 is a flowchart of a computer implemented method of applying category specific matching algorithms to each of the respective instances of content to determine a similarity score for respective instances of content according to an example embodiment.

FIG. 7 is a flowchart of a computer implemented method 700 of applying category specific matching algorithms to each of the respective instances of content to determine a similarity score for respective instances of content. Method 700 is performed for each category specific matching algorithm and begins at operation 710 by comparing each instance of content of the specific category in the first document to each instance of content of the specific category in the second document. A similarity score is generated at operation 720 for each pair of respective instances of content. At operation 730, a greedy or bi-partite matching scheme determines the set of matching pairs with the most combined similarity.

Figure 8:
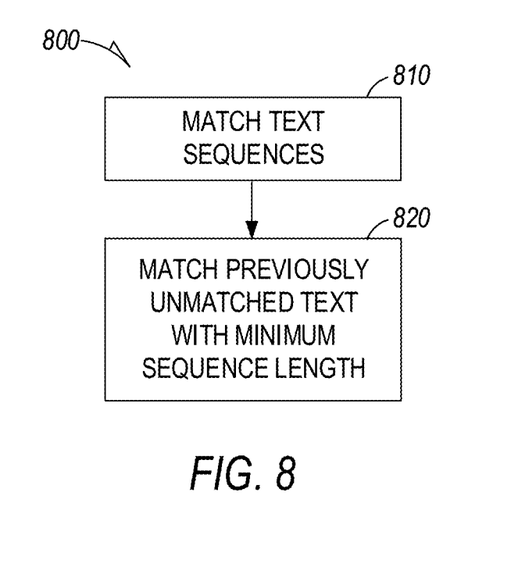
FIG. 8 is a flowchart illustrating a method performed by a text matching algorithm that is applied recursively to text instances of content comprises recursively according to an example embodiment.

FIG. 8 is a flowchart illustrating a method 800 performed by a text matching algorithm that is applied recursively to text instances of content. Sequences of text from the respective instances of text are matched at operation 810. The text may be matched by symbolic matching of varying lengths of text for a first pass of matching. In a second pass at operation 820, additional sequences of text may be matched by determining differences between previously unmatched text, where a minimum sequence length is used to ensure new content matches are meaningful.

Figure 9:
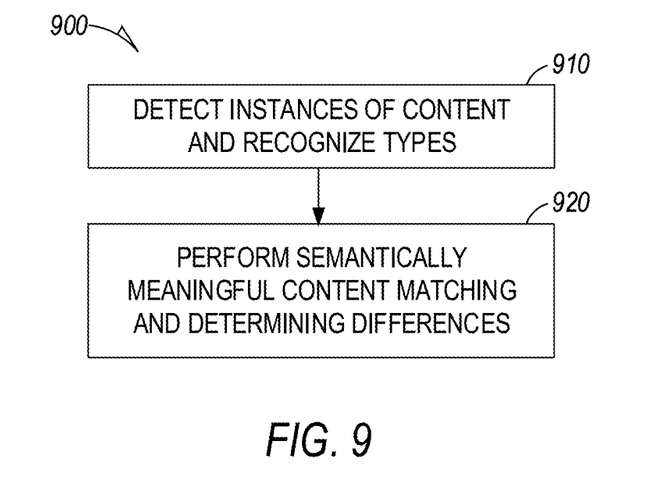
FIG. 9 is a flowchart of a computer implemented method of detecting changes between two PDF documents according to an example embodiment.

FIG. 9 is a flowchart of a computer implemented method 900 of detecting changes between two PDF documents according to an example embodiment.

At operation 910, instances of content are detected and types of content are recognized. The following instances of content are detected-plain-text classes, main body text (title, authors, table of contents, abstract, paragraphs, etc.), float text (captions, etc.), page margin text (headers, footers, etc.), image classes, figures, and other semantic classes such as tables, and lists.

At operation 920, semantically meaningful content matching and determining differences is performed.

Symbolic sequential difference computation for the text category includes use of a classic difference procedure. A multi-stream text difference determination separates text differences by semantic category. A recursive difference computation recursively applies symbolic sequence differences to identify re-ordered content.

Image difference computations may include generating an image similarity measure and an image matching scheme.

Table differences may be determined by generating a table similarity measure, a table matching scheme, and performing column and row matching.

Lists may also have differences determined by determining symbolic sequential differences with difference results aggregated at the semantic level.

A semantic difference analysis is performed at operation 930 to determine word modifications, sentiment analysis comparison, image modifications, and a memorability comparison.

Figure 10:
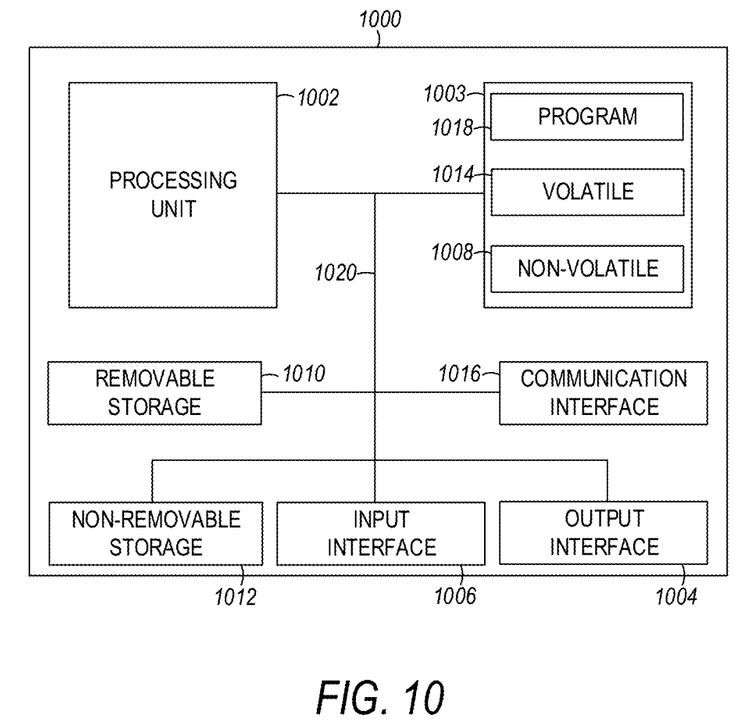
FIG. 10 is a block schematic diagram of a computer system to implement one or more example embodiments.

FIG. 10 is a block schematic diagram of a computer system 1000 to identify semantic differences between documents and for performing methods and algorithms according to example embodiments. All components need not be used in various embodiments.

One example computing device in the form of a computer 1000 may include a processing unit 1002, memory 1003, removable storage 1010, and non-removable storage 1012. Although the example computing device is illustrated and described as computer 1000, the computing device may be in different forms in different embodiments. For example, the computing device may instead be a smartphone, a tablet, smartwatch, smart storage device (SSD), or other computing device including the same or similar elements as illustrated and described with regard to FIG. 10. Devices, such as smartphones, tablets, and smartwatches, are generally collectively referred to as mobile devices or user equipment.

Although the various data storage elements are illustrated as part of the computer 1000, the storage may also or alternatively include cloud-based storage accessible via a network, such as the Internet or server-based storage. Note also that an SSD may include a processor on which the parser may be run, allowing transfer of parsed, filtered data through I/O channels between the SSD and main memory.

Memory 1003 may include volatile memory 1014 and non-volatile memory 1008. Computer 1000 may include or have access to a computing environment that includes a variety of computer-readable media, such as volatile memory 1014 and non-volatile memory 1008, removable storage 1010 and non-removable storage 1012. Computer storage includes random access memory (RAM), read only memory (ROM), erasable programmable read-only memory (EPROM) or electrically erasable programmable read-only memory (EEPROM), flash memory or other memory technologies, compact disc read-only memory (CD ROM), Digital Versatile Disks (DVD) or other optical disk storage, magnetic cassettes, magnetic tape, magnetic disk storage or other magnetic storage devices, or any other medium capable of storing computer-readable instructions.

Computer 1000 may include or have access to a computing environment that includes input interface 1006, output interface 1004, and a communication interface 1016. Output interface 1004 may include a display device, such as a touchscreen, that also may serve as an input device. The input interface 1006 may include one or more of a touchscreen, touchpad, mouse, keyboard, camera, one or more device-specific buttons, one or more sensors integrated within or coupled via wired or wireless data connections to the computer 1000, and other input devices. The computer may operate in a networked environment using a communication connection to connect to one or more remote computers, such as database servers. The remote computer may include a personal computer (PC), server, router, network PC, a peer device or other common data flow network switch, or the like. The communication connection may include a Local Area Network (LAN), a Wide Area Network (WAN), cellular, Wi-Fi, Bluetooth, or other networks. According to one embodiment, the various components of computer 1000 are connected to a system bus 1020.

Computer-readable instructions stored on a computer-readable medium are executable by the processing unit 1002 of the computer 1000, such as a program 1018. The program 1018 in some embodiments comprises software to implement one or more methods described herein. A hard drive, CD-ROM, and RAM are some examples of articles including a non-transitory computer-readable medium such as a storage device. The terms computer-readable medium, machine readable medium, and storage device do not include carrier waves or signals to the extent carrier waves and signals are deemed too transitory. Storage can also include networked storage, such as a storage area network (SAN). Computer program 1018 along with the workspace manager 1022 may be used to cause processing unit 1002 to perform one or more methods or algorithms described herein.

EXAMPLES

1. A computer implemented method of determining differences between documents, the method including parsing a first document and a second document into respective distinct instances of content, classifying the distinct instances of content into different categories, applying category specific matching algorithms to each of the respective instances of content to determine a similarity score for each of the respective instances of content, analyzing semantic differences between the first document and the second document as a function of the similarity scores, and generating a characterization of the semantic differences.
2. The method of example 1 wherein generating a characterization of the semantic differences includes generating a difference label for pairs of respective instances of matched content.
3. The method of any of examples 1-2 wherein generating a characterization of the semantic differences of the degree of differences includes generating added and removed labels for respective instances of content for unmatched content.
4. The method of any of examples 1-3 wherein the semantic differences include added, re-ordered, deleted, and modified, and where generating a characterization of the semantic differences includes generating a count of the semantic differences for each type.
5. The method of any of examples 1-4 wherein the similarity score for respective instances of content is determined as a function of similarity of the respective instances of content and similarity of context of the respective instances of content.
6. The method of any of examples 1-5 wherein classifying the distinct instances of content into different categories includes classifying the instances of content into one of a text, an image, or a table category.
7. The method of example 6 wherein text is further classified into section headings, sections, headers, footers, titles, authors, references, and captions.
8. The method of any of examples 6-7 wherein the category specific matching algorithms include machine learning models trained on labeled respective category training data.
9. The method of any of examples 1-8 wherein the similarity of context of the respective instances of content is a function of each respective instance of content's position with respect to other local identified instances of content.
10. The method of example 9 wherein image embeddings are compared to determine contexts for respective instances of content comprising images.
11. The method of any of examples 1-10 wherein applying category specific matching algorithms to each of the respective instances of content to determine a similarity score for respective instances of content includes for each category specific matching algorithm comparing each instance of content of the specific category in the first document to each instance of content of the specific category in the second document, generating a similarity score for each pair of respective instances of content, and selecting the pair with the highest similarity score as a match.
12. The method of example 11 wherein the category specific matching algorithm include a text matching algorithm, and wherein applying the text matching algorithm to text instances of content includes recursively matching sequences of text from the respective instances of text, unmatching sequences of text and evaluating longer sequences of text for matches, and matching the longer sequences of text.
13. The method of any of examples 1-12 wherein characterizing the semantic differences is performed for each matched instance of content and for each unmatched instance of content.
14. A machine-readable storage device having instructions for execution by a processor of a machine to cause the processor to perform operations to perform a method, the operations including parsing a first document and a second document into respective distinct instances of content, classifying the distinct instances of content into different categories, applying category specific matching algorithms to each of the respective instances of content to determine a similarity score for each of the respective instances of content, analyzing semantic differences between the first document and the second document as a function of the similarity scores, and generating a characterization of the semantic differences.
15. The device of example 14 wherein generating a characterization of the semantic differences includes generating a difference label for pairs of respective instances of matched content and wherein generating a characterization of the semantic differences of the degree of differences includes generating added and removed labels for respective instances of content for unmatched content.

16. The device of any of examples 14-15 wherein the semantic differences include added, re-ordered, deleted, and modified, and where generating a characterization of the semantic differences include generating a count of the semantic differences for each type.

17. The device of any of examples 14-16 wherein applying category specific matching algorithms to each of the respective instances of content to determine a similarity score for respective instances of content includes for each category specific matching algorithm comparing each instance of content of the specific category in the first document to each instance of content of the specific category in the second document, generating a similarity score for each pair of respective instances of content, and selecting the pair with the highest similarity score as a match.

18. The device of example 17 wherein the category specific matching algorithm includes a text matching algorithm, and wherein applying the text matching algorithm to text instances of content includes recursively matching sequences of text from the respective instances of text, unmatching sequences of text and evaluating longer sequences of text for matches, and matching the longer sequences of text.

19. A device includes a processor and a memory device coupled to the processor and having a program stored thereon for execution by the processor to perform operations. The operations include parsing a first document and a second document into respective distinct instances of content, classifying the distinct instances of content into different categories, applying category specific matching algorithms to each of the respective instances of content to determine a similarity score for each of the respective instances of content, analyzing semantic differences between the first document and the second document as a function of the similarity scores, and generating a characterization of the semantic differences.

20. The device of example 19 wherein applying category specific matching algorithms to each of the respective instances of content to determine a similarity score for respective instances of content includes for each category specific matching algorithm comparing each instance of content of the specific category in the first document to each instance of content of the specific category in the second document, generating a similarity score for each pair of respective instances of content, and selecting the pair with the highest similarity score as a match.

Although a few embodiments have been described in detail above, other modifications are possible. For example, the logic flows depicted in the figures do not require the particular order shown, or sequential order, to achieve desirable results. Other steps may be provided, or steps may be eliminated, from the described flows, and other components may be added to, or removed from, the described systems. Other embodiments may be within the scope of the following claims.

The invention claimed is:

1. A computer implemented method of determining differences between documents, the method comprising:
    parsing a first document and a second document into respective distinct instances of content;
    classifying the distinct instances of content into different semantic categories including text, images, and tables;
    applying category specific matching algorithms to content within each of the respective instances of content to determine a similarity score for each of the respective instances of content to match the respective instances, wherein the category specific category matching algorithms comprise machine learning models trained on labeled respective category training data;
    analyzing semantic differences between the content within matching respective instances of the first document and the second document as a function of the similarity scores; and
    generating a characterization of the semantic differences.

2. The method of claim 1 wherein generating a characterization of the semantic differences comprises generating a difference label for pairs of respective instances of matched content.

3. The method of claim 1 wherein generating a characterization of the semantic differences of the degree of differences comprises generating added and removed labels for respective instances of content for unmatched content.

4. The method of claim 1 wherein the semantic differences comprise added, re-ordered, deleted, and modified, and where generating a characterization of the semantic differences comprises generating a count of the semantic differences for each type of semantic difference.

5. The method of claim 1 wherein the similarity score for respective instances of content is determined as a function of similarity of the respective instances of content and similarity of context of the respective instances of content.

6. The method of claim 1 wherein classifying the distinct instances of content into different categories comprises classifying the instances of content into one of a text, an image, or a table category.

7. The method of claim 6 wherein text is further classified into section headings, sections, headers, footers, titles, authors, references, and captions.

8. The method of claim 1 wherein the similarity score of the respective instances of content is a function of each respective instance of content's position with respect to other local identified instances of content.

9. The method of claim 8 wherein image embeddings are compared to determine contexts for respective instances of content comprising images.

10. The method of claim 1 wherein applying category specific matching algorithms to each of the respective instances of content to determine a similarity score for respective instances of content comprises for each category specific matching algorithm:
    comparing each instance of content of the specific category in the first document to each instance of content of the specific category in the second document;
    generating a similarity score for each pair of respective instances of content; and
    selecting the pair with the highest similarity score as a match.

11. The method of claim 10 wherein the category specific matching algorithm comprises a text matching algorithm, and wherein applying the text matching algorithm to text instances of content comprises recursively:
    matching sequences of text from the respective instances of text;
    unmatching sequences of text and evaluating longer sequences of text for matches; and
    matching the longer sequences of text.

12. The method of claim 1 wherein characterizing the semantic differences is performed for each matched instance of content and for each unmatched instance of content.

13. The method of claim 1 wherein respective instances are matched based on having similar content and on being in similar locations within the respective first and second documents.

14. A machine-readable storage device having instructions for execution by a processor of a machine to cause the processor to perform operations to perform a method, the operations comprising:
 parsing a first document and a second document into respective distinct instances of content;
 classifying the distinct instances of content into different semantic categories including text, images, and tables;
 applying category specific matching algorithms to content within each of the respective instances of content to determine a similarity score for each of the respective instances of content to match the respective instances, wherein the category specific category matching algorithms comprise machine learning models trained on labeled respective category training data;
 analyzing semantic differences between the content within matching respective instances of the first document and the second document as a function of the similarity scores; and
 generating a characterization of the semantic differences.

15. The device of claim 14 wherein generating a characterization of the semantic differences comprises generating a difference label for pairs of respective instances of matched content and wherein generating a characterization of the semantic differences of the degree of differences comprises generating added and removed labels for respective instances of content for unmatched content.

16. The device of claim 14 wherein the semantic differences comprise added, re-ordered, deleted, and modified, and where generating a characterization of the semantic differences comprises generating a count of the semantic differences for each type of semantic difference.

17. The device of claim 14 wherein applying category specific matching algorithms to each of the respective instances of content to determine a similarity score for respective instances of content comprises for each category specific matching algorithm:
 comparing each instance of content of the specific category in the first document to each instance of content of the specific category in the second document;
 generating a similarity score for each pair of respective instances of content; and
 selecting the pair with the highest similarity score as a match.

18. The device of claim 17 wherein the category specific matching algorithm comprises a text matching algorithm, and wherein applying the text matching algorithm to text instances of content comprises recursively:
 matching sequences of text from the respective instances of text;
 unmatching sequences of text and evaluating longer sequences of text for matches; and
 matching the longer sequences of text.

19. A device comprising:
 a processor, and
 a memory device coupled to the processor and having a program stored thereon for execution by the processor to perform operations comprising:
 parsing a first document and a second document into respective distinct instances of content;
 classifying the distinct instances of content into different semantic categories including text, images, and tables,
 applying category specific matching algorithms to content within each of the respective instances of content to determine a similarity score for each of the respective instances of content to match the respective instances, wherein the category specific category matching algorithms comprise machine learning models trained on labeled respective category training data;
 analyzing semantic differences between the content within matching respective instances of the first document and the second document as a function of the similarity scores; and
 generating a characterization of the semantic differences.

20. The device of claim 19 wherein applying category specific matching algorithms to each of the respective instances of content to determine a similarity score for respective instances of content comprises for each category specific matching algorithm:
 comparing each instance of content of the specific category in the first document to each instance of content of the specific category in the second document;
 generating a similarity score for each pair of respective instances of content; and
 selecting the pair with the highest similarity score as a match.

* * * * *